US005996947A

United States Patent [19]

Palmieri, III

[11] Patent Number: 5,996,947

[45] Date of Patent: Dec. 7, 1999

[54] HOPPER STAND

[76] Inventor: Salvatore Palmieri, III, 114 Winterglen Dr., Sanford, Fla. 32771

[21] Appl. No.: 09/133,439

[22] Filed: Aug. 13, 1998

[51] Int. Cl.[6] .............................. B65G 47/04; A47G 7/00; F16M 11/00

[52] U.S. Cl. ................................ 248/146; 47/39; 248/152

[58] Field of Search .................................... 248/146, 152, 248/154; 211/71.01, 72; 198/540; 47/39, 44, 45

[56] References Cited

U.S. PATENT DOCUMENTS

| | | | |
|---|---|---|---|
| 3,598,350 | 8/1971 | Kaufman | 248/97 |
| 4,064,993 | 12/1977 | Getner | 211/85 |
| 5,590,861 | 1/1997 | Ardolino | 248/146 |

*Primary Examiner*—Derek J. Berger
*Assistant Examiner*—Jerome A. DeLuca

[57] ABSTRACT

A new hopper stand for holding the hopper of a texturing spraying device in a stable position above a surface. The inventive device includes a main support member and a secondary support member. The main support member has an elongate base portion and a pair of spaced apart elongate leg portions. The secondary support member has a base portion and a leg portion. The base portion of the secondary support member is coupled to the base portion of the main support member. An upper support rail is coupled to the leg portions of the main support member and the secondary support member. A lower support rail is also coupled to the leg portions of the main support member and the secondary support member.

10 Claims, 2 Drawing Sheets

HOPPER STAND

BACKGROUND OF THE INVENTION

1. Field of the Invention

The present invention relates to devices for holding a texturing spraying device hopper and more particularly pertains to a new hopper stand for holding the hopper of a texturing spraying device in a stable position above a surface.

2. Description of the Prior Art

The use of devices for holding a texturing spraying device hopper is known in the prior art. More specifically, devices for holding a texturing spraying device hopper heretofore devised and utilized are known to consist basically of familiar, expected and obvious structural configurations, notwithstanding the myriad of designs encompassed by the crowded prior art which have been developed for the fulfillment of countless objectives and requirements.

Known prior art devices for holding a texturing spraying device hopper include U.S. Pat. No. Des. 353,695; U.S. Pat. No. 5,411,229; EPO Patent No. EP 0 582 241 A1 (inventors: Meseke et al.); U.S. Pat. No. 5,360,189; U.S. Pat. No. 812,157; U.S. Pat. No. 3,412,965; and EPO Patent No. EP 0 548 786 A1.

While these devices fulfill their respective, particular objectives and requirements, the aforementioned patents do not disclose a new hopper stand. The inventive device includes a main support member and a secondary support member. The main support member has an elongate base portion and a pair of spaced apart elongate leg portions. The secondary support member has a base portion and a leg portion. The base portion of the secondary support member is coupled to the base portion of the main support member. An upper support rail is coupled to the leg portions of the main support member and the secondary support member. A lower support rail is also coupled to the leg portions of the main support member and the secondary support member.

In these respects, the hopper stand according to the present invention substantially departs from the conventional concepts and designs of the prior art, and in so doing provides an apparatus primarily developed for the purpose of holding the hopper of a texturing spraying device in a stable position above a surface.

SUMMARY OF THE INVENTION

In view of the foregoing disadvantages inherent in the known types of devices for holding a texturing spraying device hopper now present in the prior art, the present invention provides a new hopper stand construction wherein the same can be utilized for holding the hopper of a texturing spraying device in a stable position above a surface.

The general purpose of the present invention, which will be described subsequently in greater detail, is to provide a new hopper stand apparatus and method which has many of the advantages of the devices for holding a texturing spraying device hopper mentioned heretofore and many novel features that result in a new hopper stand which is not anticipated, rendered obvious, suggested, or even implied by any of the prior art devices for holding a texturing spraying device hopper, either alone or in any combination thereof.

To attain this, the present invention generally comprises a main support member and a secondary support member. The main support member has an elongate base portion and a pair of spaced apart elongate leg portions. The secondary support member has a base portion and a leg portion. The base portion of the secondary support member is coupled to the base portion of the main support member. An upper support rail is coupled to the leg portions of the main support member and the secondary support member. A lower support rail is also coupled to the leg portions of the main support member and the secondary support member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hopper stand apparatus and method which has many of the advantages of the devices for holding a texturing spraying device hopper mentioned heretofore and many novel features that result in a new hopper stand which is not anticipated, rendered obvious, suggested, or even implied by any of the prior art devices for holding a texturing spraying device hopper, either alone or in any combination thereof.

It is another object of the present invention to provide a new hopper stand which may be easily and efficiently manufactured and marketed.

It is a further object of the present invention to provide a new hopper stand which is of a durable and reliable construction.

An even further object of the present invention is to provide a new hopper stand which is susceptible of a low cost of manufacture with regard to both materials and labor, and which accordingly is then susceptible of low prices of sale to the consuming public, thereby making such hopper stand economically available to the buying public.

Still yet another object of the present invention is to provide a new hopper stand which provides in the apparatuses and methods of the prior art some of the advantages thereof, while simultaneously overcoming some of the disadvantages normally associated therewith.

Still another object of the present invention is to provide a new hopper stand for holding the hopper of a texturing spraying device in a stable position above a surface.

Yet another object of the present invention is to provide a new hopper stand which includes a main support member and a secondary support member. The main support member has an elongate base portion and a pair of spaced apart elongate leg portions. The secondary support member has a base portion and a leg portion. The base portion of the secondary support member is coupled to the base portion of the main support member. An upper support rail is coupled to the leg portions of the main support member and the secondary support member. A lower support rail is also coupled to the leg portions of the main support member and the secondary support member.

Still yet another object of the present invention is to provide a new hopper stand that holds the hopper a texturing spraying device generally upright and level above a horizontal surface so that the hopper can be easily filled with texturing material to be sprayed by the device and so that the texturing device can be easily cleaned without the user having to hold the hopper with their arms.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
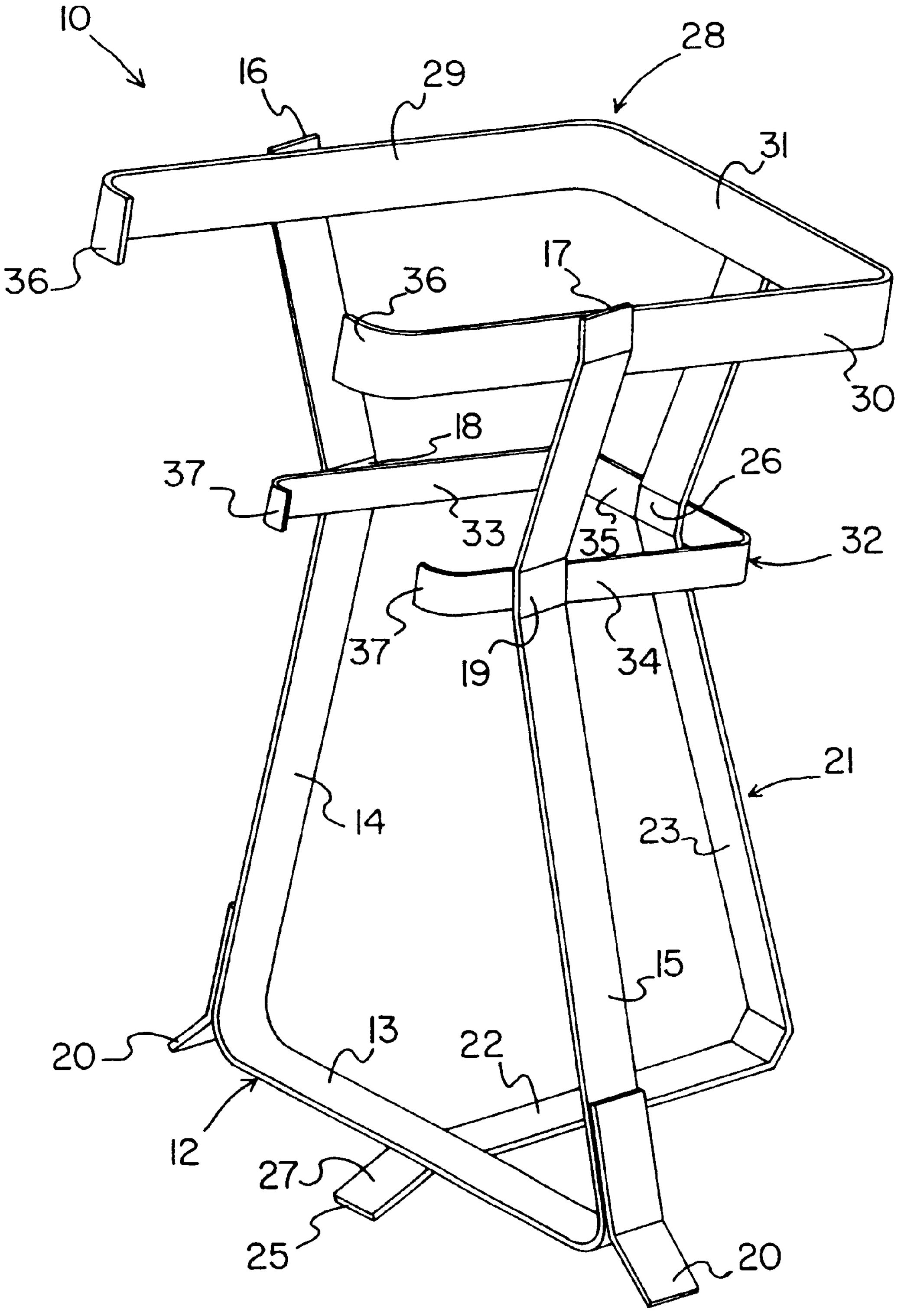
FIG. 1 is a schematic side view of a new hopper stand in use holding a hopper according to the present invention.
Figure 2:
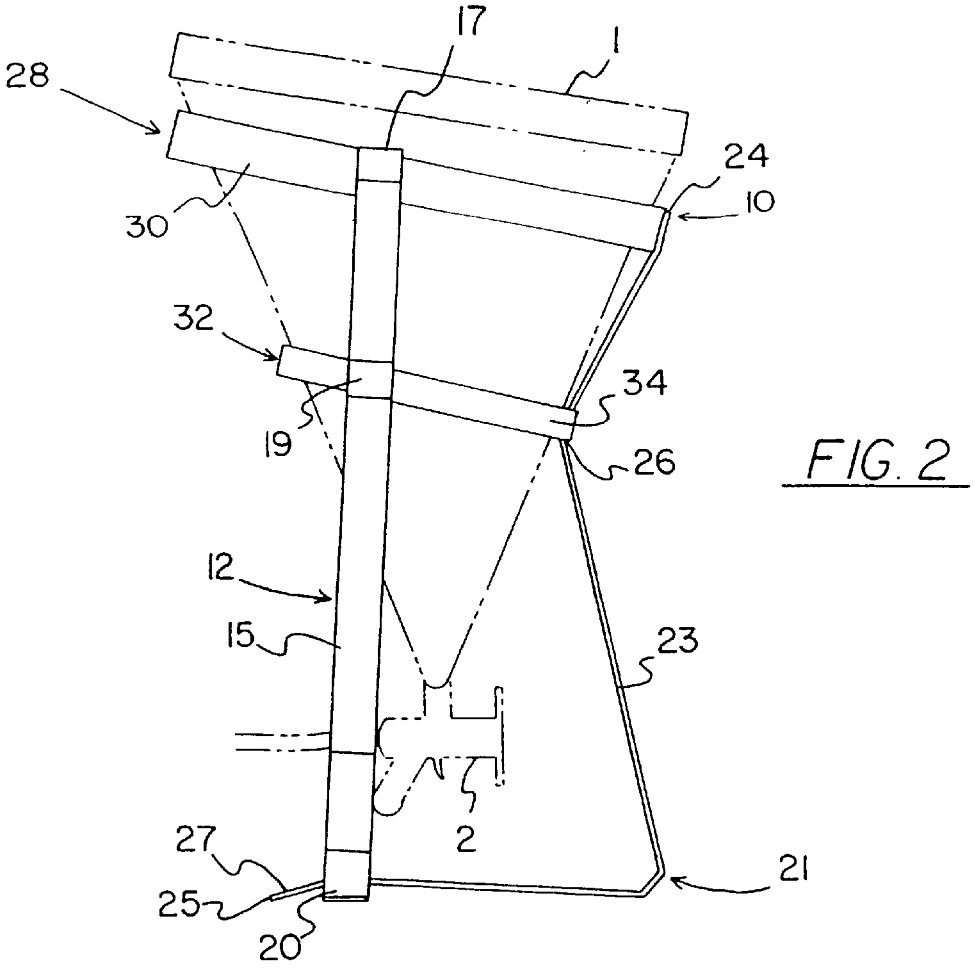
FIG. 2 is a schematic top side view of the present invention.
Figure 3:
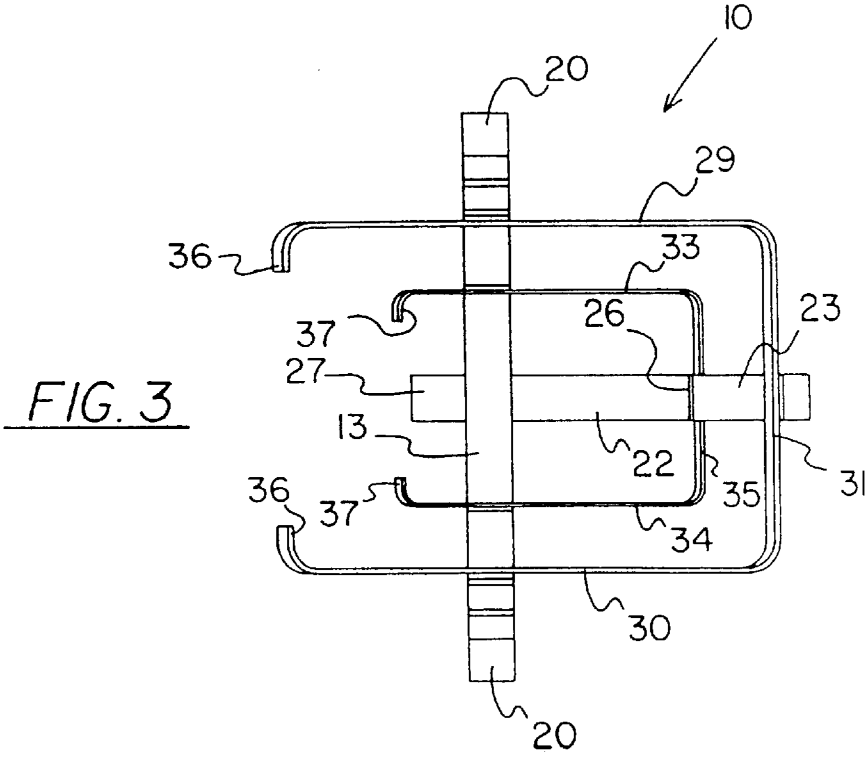
FIG. 3 is a schematic perspective view of the present invention.

With reference now to the drawings, and in particular to FIGS. 1 through 3 thereof, a new hopper stand embodying the principles and concepts of the present invention and generally designated by the reference numeral 10 will be described.

In use, the stand is designed for holding a generally pyramidal hopper 1 for holding texturing material for a texturing spraying device having a spray gun 2 in fluid communication with the bottom apex of the hopper 1. As best illustrated in FIGS. 1 through 3, the hopper stand 10 generally comprises a main support member 12 and a secondary support member 21. The main support member 12 has an elongate base portion 13 and a pair of spaced apart elongate leg portions 14,15. The secondary support member 21 has a base portion 22 and a leg portion 23. The base portion 22 of the secondary support member 21 is coupled to the base portion 13 of the main support member 12. An upper support rail 28 is coupled to the leg portions 14,15,23 of the main support member 12 and the secondary support member 21. A lower support rail 32 is also coupled to the leg portions 14,15,23 of the main support member 12 and the secondary support member 21.

In closer detail, the main support member 12 has an elongate base portion 13 and a pair of spaced apart elongate leg portions 14,15. The leg portions 14,15 of the main support member 12 are upwardly extended from the base portion 13 of the main support member 12 with the base portion 13 of the main support member 12 connecting the leg portions 14,15 of the main support member 12 together. Each of the leg portions 14,15 are generally V-shaped and have an upper free end 16,17 and a vertex region 18,19 positioned between the base portion 13 of the main support member 12 and the upper free end 16,17. The vertex regions 18,19 of the leg portions 14,15 of the main support member 12 preferably extend towards each other. Even more preferably a pair of resting feet 20 designed for resting on a ground surface are coupled to the main support member 12 with a resting for coupled to each leg portion 14,15 adjacent the base portion 13.

The secondary support member 21 has a base portion 22 and a leg portion 23, an upper end 24 and a lower end 25. The leg portion 23 of the secondary support member 21 is upwardly extended from the base portion 22 of the secondary support member 21. The lower end 25 of the secondary support member 21 is located adjacent the base portion 22 of the secondary support member 21. The upper end 24 of the secondary support member 21 is located adjacent the leg portion 23 of the secondary support member 21. The base portion 22 of the secondary support member 21 adjacent the lower end 25 of the secondary support member 21 is coupled to the base portion 13 of the main support member 12 generally equidistantly between the leg portions 14,15 of the main support member 12. The lower end of the secondary support member 21 preferably has a foot portion 27 outwardly and downwardly extending from the base portion 13 of the main support member 12. The leg portion 23 of the secondary support member 21 is generally V-shaped and has a vertex region 26 located between the base portion 22 of the secondary support member 21 and the upper end 24 of the secondary support member 21. The vertex region 26 of the leg portion 23 of the secondary support member 21 preferably extends towards the main support member 12.

The upper support rail 28 is designed for resting the upper portion of a hopper 1 of a texturing spraying device thereon. The upper support rail 28 is generally U-shaped and has a paid of spaced apart arm portions 29,30 and a cross portion 31 connecting the arm portions 29,30 of the upper support rail 28 together. The cross portion 31 of the upper support rail 28 is coupled to the upper end 24 of the secondary support member 21 at a point generally equidistant between the arm portions 29,30 of the upper support rail 28. One of the arm portions 29 of the upper support rail 28 is coupled to the upper free end 16 of one of the leg portions 14 of the main support member 12 and another of the arm portions 30 of the upper support rail 28 is coupled to the upper free end 17 of another of the leg portions 15 of the main support member 12. At the free end of the arm portions 29,30 of the upper support rail 28 is a flange 36 which inwardly extend towards each other.

The lower support rail 32 is generally U-shaped and has a paid of spaced apart arm portions 33,34 and a cross portion 35 connecting the arm portions of the lower support rail 32 together. The cross portion 35 of the lower support rail 32 is coupled to the vertex region 26 of the leg portion 23 of secondary support member 21. One of the arm portions 33 of the lower support rail 32 is coupled to the vertex region 18 of one of the leg portions 14 of the main support member 12 while another of the arm portions 33 of the lower support rail 32 is coupled to the vertex region 19 of another of the leg portions 15 of the main support member 12. Like the upper support rail, each of the arm portions of the lower support rail 32 has a free end with each free end having a flange 37 which inwardly extending towards each other.

In an ideal illustrative embodiment, the stand has a height of about 24 inches and a width between the leg portions 14,15 of the main support member 12 of about 14 inches and a depth of about 16 inches.

In use, a hopper 1 is rested on the upper support rail so that the hopper downwardly extends in the space between the leg portions. The base portions of the stand are restable on a surface to support the hopper on the ground surface in an upright position.

It is also noted that the upper and lower support rails 28,32 may optionally be a more curved U-shape instead of the generally rectangular U-shape depicted in the Figures to better hold hoppers having an oval cross section rather than a rectangular cross section. The arm portions and the cross portions of the upper and lower support rails in this more curved U-shaped embodiment would be generally arcuate in shape such that the support rails each have a generally parabolic or ovaloid configuration As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stand for holding a generally pyramidal hopper for a texturing spraying device, said stand comprising:

a main support member having an elongate base portion and a pair of spaced apart elongate leg portions;

a secondary support member having a base portion and a leg portion;

said base portion of said secondary support member being coupled to said base portion of said main support member;

an upper support rail being generally U-shaped and having a paid of spaced apart arm portions and a cross portion connecting said arm portions of said upper support rail together;

said cross portion of said upper support rail being coupled to said leg portion of said secondary support member;

one of said arm portions of said upper support rail being coupled to one of said leg portions of said main support member, another of said arm portions of said upper support rail being coupled to another of said leg portions of said main support member;

a lower support rail being generally U-shaped and having a paid of spaced apart arm portions and a cross portion connecting said arm portions of said lower support rail together;

said cross portion of said lower support rail being coupled to said leg portion of secondary support member; and one of said arm portions of said lower support rail being coupled to one of said leg portions of said main support member, another of said arm portions of said lower support rail being coupled to another of said leg portions of said main support member.

2. The stand of claim 1, wherein each of said leg portions is generally V-shaped and having an upper free end and a vertex region positioned between said base portion of said main support member and said upper free end, said vertex regions of said leg portions of said main support member extending towards each other.

3. The stand of claim 2, wherein said secondary support member has an upper end, and wherein said leg portion of said secondary support member is generally V-shaped and has a vertex region located between said base portion of said secondary support member and said upper end of said secondary support member, said vertex region of said leg portion of said secondary support member extending towards said main support member.

4. The stand of claim 3, wherein said cross portion of said upper support rail is coupled to said upper end of said secondary support, wherein one of said arm portions of said upper support rail is coupled to the upper free end of one of said leg portions of said main support member, wherein another of said arm portions of said upper support rail is coupled to the upper free end of another of said leg portions of said main support member.

5. The stand of claim 3, wherein said cross portion of said lower support rail is coupled to said vertex region of said leg portion of secondary support member, wherein one of said arm portions of said lower support rail is coupled to the vertex region of one of said leg portions of said main support member, and wherein another of said arm portions of said lower support rail is coupled to the vertex region of another of said leg portions of said main support member.

6. The stand of claim 1, further comprising a pair of resting feet, one of said feet being coupled to one of said leg portions of said main support member adjacent said base portion of said main support member, another of said feet being coupled to another of said leg portions of said main support member adjacent said base portion of said main support member.

7. The stand of claim 1, wherein said secondary support member has a lower end, wherein said lower end of said secondary support member has a foot portion outwardly and downwardly extending from said base portion of said main support member.

8. The stand of claim 1, wherein each of said arm portions of said upper support rail has a free end, wherein each of said free ends of said arm portions of said upper support rail has a flange, said flanges of arm portions of said upper support rail inwardly extending towards each other.

9. The stand of claim 1, wherein each of said arm portions of said lower support rail has a free end, each of said free ends of said arm portions of said lower support rail having a flange, wherein said flanges of arm portions of said lower support rail inwardly extend towards each other.

10. A stand for holding a generally pyramidal hopper for a texturing spraying device, said stand comprising:

a main support member having an elongate base portion and a pair of spaced apart elongate leg portions, said leg portions of said main support member being upwardly extended from said base portion of said main support member, said base portion of said main support member connecting said leg portions of said main support member together;

each of said leg portions being generally V-shaped and having an upper free end and a vertex region positioned between said base portion of said main support member and said upper free end, said vertex regions of said leg portions of said main support member extending towards each other;

a pair of resting feet, one of said feet being coupled to one of said leg portions of said main support member adjacent said base portion of said main support member, another of said feet being coupled to another of said leg portions of said main support member adjacent said base portion of said main support member;

a secondary support member having a base portion and a leg portion, an upper end and a lower end, said leg portion of said secondary support member being upwardly extended from said base portion of said secondary support member, said lower end of said secondary support member being located adjacent said base portion of said secondary support member, said upper end of said secondary support member being located adjacent said leg portion of said secondary support member;

said base portion of said secondary support member being coupled to said base portion of said main support member generally equidistantly between said leg portions of said main support member;

said lower end of said secondary support member having a foot portion outwardly and downwardly extending from said base portion of said main support member;

said leg portion of said secondary support member being generally V-shaped and having a vertex region located between said base portion of said secondary support member and said upper end of said secondary support member, said vertex region of said leg portion of said secondary support member extending towards said main support member;

an upper support rail being generally U-shaped and having a paid of spaced apart arm portions and a cross portion connecting said arm portions of said upper support rail together;

said cross portion of said upper support rail being coupled to said upper end of said secondary support member;

one of said arm portions of said upper support rail being coupled to the upper free end of one of said leg portions of said main support member, another of said arm portions of said upper support rail being coupled to the upper free end of another of said leg portions of said main support member;

each of said arm portions of said upper support rail having a free end, each of said free ends of said arm portions of said upper support rail having a flange, said flanges of arm portions of said upper support rail inwardly extending towards each other;

a lower support rail being generally U-shaped and having a paid of spaced apart arm portions and a cross portion connecting said arm portions of said lower support rail together;

said cross portion of said lower support rail being coupled to said vertex region of said leg portion of secondary support member;

one of said arm portions of said lower support rail being coupled to the vertex region of one of said leg portions of said main support member, another of said arm portions of said lower support rail being coupled to the vertex region of another of said leg portions of said main support member; and each of said arm portions of said lower support rail having a free end, each of said free ends of said arm portions of said lower support rail having a flange, said flanges of arm portions of said lower support rail inwardly extending towards each other.

* * * * *